US012627671B2

(12) United States Patent (10) Patent No.: US 12,627,671 B2
Sood et al. (45) Date of Patent: May 12, 2026

(54) SHARED RISK ASSESSMENT AND CLUSTERING FOR INDUSTRIAL IOT APPLICATIONS

(71) Applicant: Cisco Technology, Inc., San Jose, CA (US)

(72) Inventors: Navdeep Sood, Bangalore (IN); Praveen Kumar, Bengaluru (IN)

(73) Assignee: Cisco Technology, Inc., San Jose, CA (US)

( * ) Notice: Subject to any disclaimer, the term of this patent is extended or adjusted under 35 U.S.C. 154(b) by 475 days.

(21) Appl. No.: 18/364,600

(22) Filed: Aug. 3, 2023

(65) Prior Publication Data

US 2025/0047682 A1 Feb. 6, 2025

(51) Int. Cl.
H04L 9/40 (2022.01)
(52) U.S. Cl.
CPC .................................. H04L 63/104 (2013.01)
(58) Field of Classification Search
CPC ... H04L 63/104; H04L 12/2803; H04L 67/12; H04W 4/005
See application file for complete search history.

(56) References Cited

U.S. PATENT DOCUMENTS

| 7,099,286 | B1 * | 8/2006 | Swallow | ............... | H04L 45/123 |
| | | | | | 370/255 |
| 10,785,125 | B2 * | 9/2020 | Ramachandran ... | | H04L 67/1044 |
| 11,082,296 | B2 * | 8/2021 | Du | ...................... | H04L 41/0816 |
| 11,265,718 | B2 * | 3/2022 | Kaushik | .............. | H04W 12/121 |

| 11,470,106 | B1 * | 10/2022 | Lin | ...................... | H04L 63/1433 |
| 11,575,751 | B2 * | 2/2023 | Rodriguez Bravo . | | H04W 4/021 |
| 11,683,328 | B2 * | 6/2023 | Ektare | ..................... | H04L 43/12 |
| | | | | | 726/22 |
| 11,706,246 | B2 * | 7/2023 | Du | ......................... | H04W 12/68 |

(Continued)

FOREIGN PATENT DOCUMENTS

| CN | 114186837 A | 3/2022 |
| WO | 2021183082 A1 | 9/2021 |

OTHER PUBLICATIONS

Rizvi, Syed, Nicholas Mcintyre, and Jungwoo Ryoo. "Computing security scores for IoT device vulnerabilities." 2019 International Conference on Software Security and Assurance (ICSSA). IEEE, 2019. (Year: 2019).*

*Primary Examiner* — Jung W Kim
*Assistant Examiner* — Sameera Wickramasuriya
(74) *Attorney, Agent, or Firm* — Baker Botts L.L.P.

(57) ABSTRACT

In one embodiment, a method may access a plurality of Industrial Internet of Things (IIoT) devices within a network. The method may determine a shared risk model associated with the plurality of IIoT devices within the network. The method may determine, using the shared risk model, a shared risk value for each of the plurality of IIoT devices within the network. The method may determine, using the shared risk model, a plurality of associated clusters of IIoT devices within the network based on the shared risk value for each of the plurality of IIoT devices within the network. The method may determine an associated risk minimization for each of the plurality of IIoT devices within the network based on the plurality of associated clusters of IIoT devices within the network and the shared risk value for each of the plurality of IIoT devices within the network.

18 Claims, 8 Drawing Sheets

(56) References Cited

U.S. PATENT DOCUMENTS

| | | | |
|---|---|---|---|
| 11,736,508 B2 * | 8/2023 | Fitzgerald | H04L 63/1408 726/25 |
| 2014/0136881 A1 | 5/2014 | Vasseur et al. | |
| 2016/0117622 A1 * | 4/2016 | Maeno | G06F 11/008 705/7.28 |
| 2018/0144139 A1 * | 5/2018 | Cheng | G06F 21/577 |
| 2019/0036970 A1 * | 1/2019 | Shih | H04L 67/141 |
| 2019/0132205 A1 * | 5/2019 | Du | H04L 41/069 |
| 2019/0334934 A1 * | 10/2019 | Teshome | H04W 12/106 |
| 2020/0104509 A1 * | 4/2020 | Furuichi | H04L 63/1433 |
| 2020/0304536 A1 * | 9/2020 | Mahabir | H04L 63/1475 |
| 2021/0306354 A1 * | 9/2021 | Raghuramu | H04L 67/535 |
| 2022/0215306 A1 | 7/2022 | Puto et al. | |
| 2022/0311799 A1 | 9/2022 | Du | |

* cited by examiner

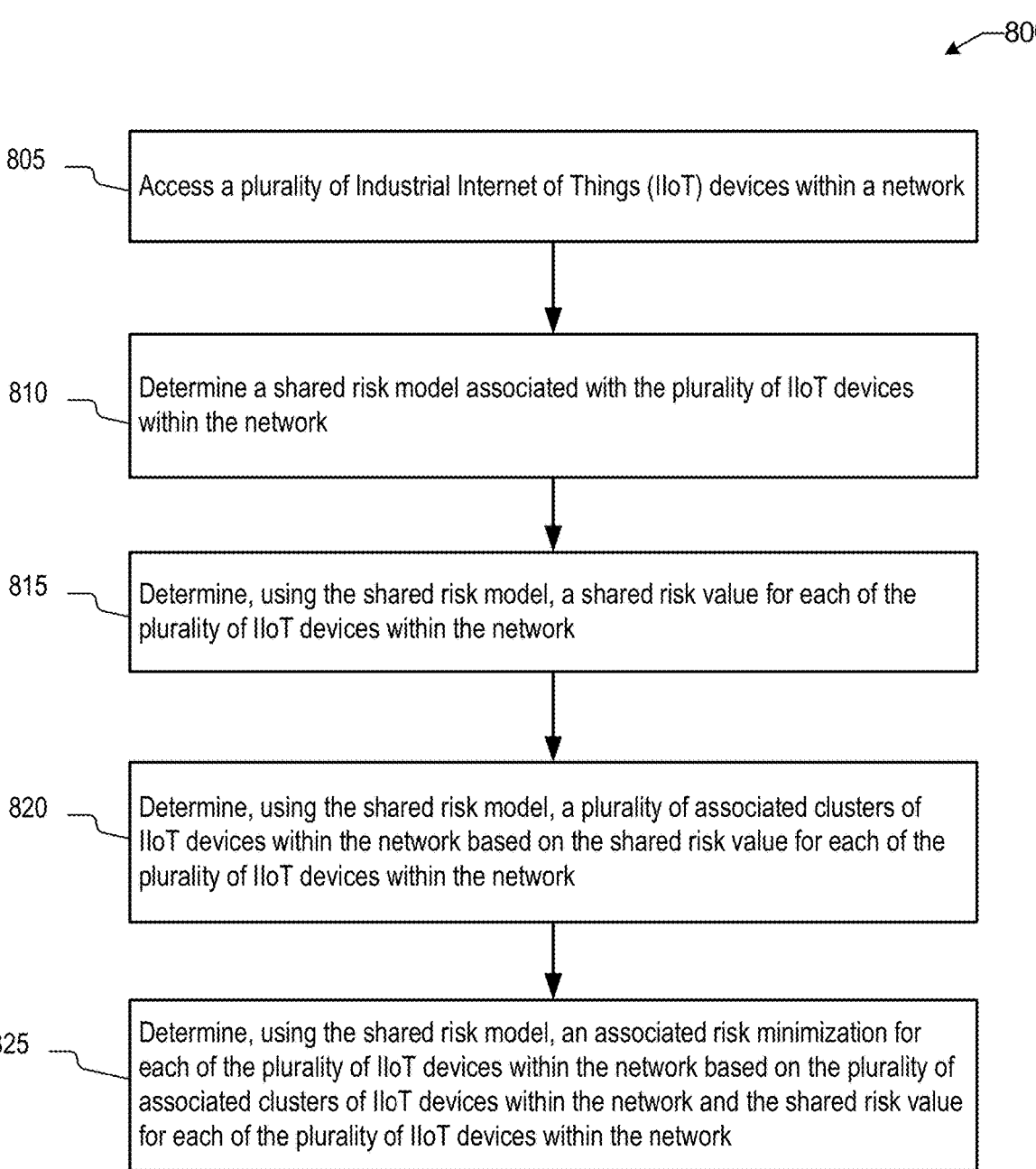

805 — Access a plurality of Industrial Internet of Things (IIoT) devices within a network 810 — Determine a shared risk model associated with the plurality of IIoT devices within the network 815 — Determine, using the shared risk model, a shared risk value for each of the plurality of IIoT devices within the network 820 — Determine, using the shared risk model, a plurality of associated clusters of IIoT devices within the network based on the shared risk value for each of the plurality of IIoT devices within the network 825 — Determine, using the shared risk model, an associated risk minimization for each of the plurality of IIoT devices within the network based on the plurality of associated clusters of IIoT devices within the network and the shared risk value for each of the plurality of IIoT devices within the network

*FIG. 8*

SHARED RISK ASSESSMENT AND CLUSTERING FOR INDUSTRIAL IOT APPLICATIONS

TECHNICAL FIELD

The present disclosure relates generally to automated shared risk assessment, and, more particularly, to shared risk groups for a plurality of devices in Industrial Internet of Things (IIoT) networks.

BACKGROUND

Industrial Internet of Things (IIoT) is a system of interconnected objects, such as machines and devices, that may transfer or exchange information over a network with no human intervention. The IIoT network may include a plurality of devices to collect, send, and act on data in different industries. For example, the IIoT network may include cameras, badge readers, and AC control systems in an office or a building to exchange information with each other and evaluate the information. The cybersecurity infrastructure of the IIoT network is susceptible to malfunctions and/or failures of IIoT devices within the network. The malfunctioned or failed IIoT devices may cause catastrophic consequences in high risk and potentially life-threatening situations. Thus, these problems may be acute in various IIoT networks associated with high-risk systems, such as manufacturing, transportation, oil and gas, power generation and transmission, mines, and ports, etc. Furthermore, the downtime of some normal IIoT or non-industrial devices may also result in inconveniences for a user in non-emergent situations.

BRIEF DESCRIPTION OF THE DRAWINGS

FIG. 8 illustrates an example method for determining a shared risk model for a plurality of IIoT devices.

DESCRIPTION OF EXAMPLE EMBODIMENTS

Overview

Figure 1:
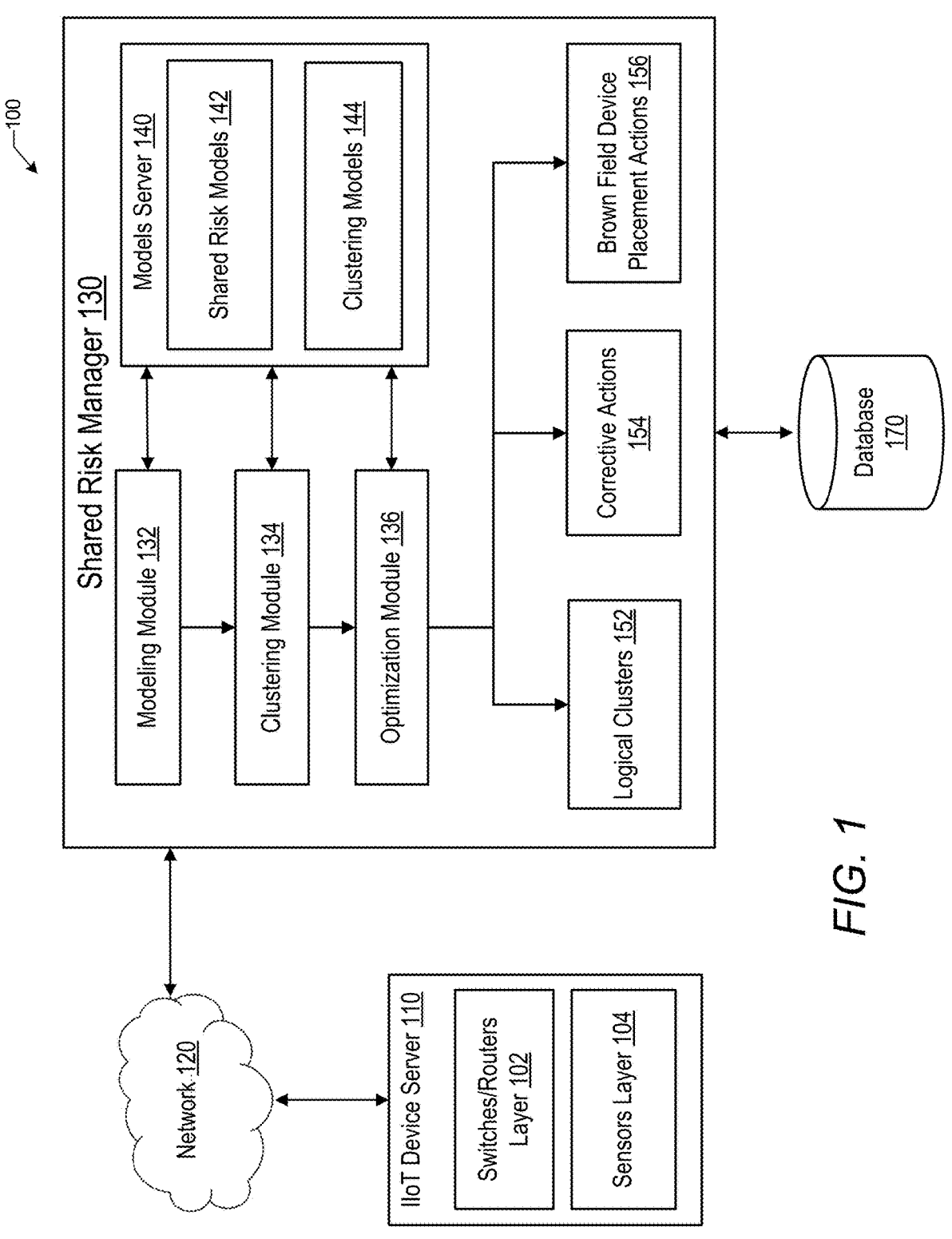
FIG. 1 illustrates an example security control system 100 for use in a product.

In one or more embodiments, an apparatus may comprise one or more processors, and one or more computer-readable non-transitory storage media coupled the to one or more of the processors. The one or more computer-readable non-transitory storage media may comprise instructions operable when executed by one or more of the processors to cause one or more components of the apparatus to perform operations to access a plurality of IIoT devices within a network. The apparatus is configured to determine a shared risk model associated with the plurality of IIoT devices within the network. The apparatus is configured to use the shared risk model to determine a shared risk value for each of the plurality of IIoT devices within the network. The apparatus is configured to use the shared risk model to determine a plurality of associated clusters of the plurality of IIoT devices within the network based on the shared risk value for each of the plurality of IIoT devices within the network. The apparatus is configured to use the shared risk model to determine an associated risk minimization for each of the plurality of IIoT devices within the network based on the plurality of associated clusters of IIoT devices within the network and the shared risk value for each of the plurality of IIoT devices within the network.

In one or more embodiments, a method, by an apparatus, may access a plurality of IIoT devices within a network. A shared risk model associated with the plurality of IIoT devices within the network is determined. The shared risk model determines a shared risk value for each of the plurality of IIoT devices within the network. The shared risk model may determine a plurality of associated clusters of the plurality of IIoT devices within the network based on the shared risk value for each of the plurality of IIoT devices within the network. The shared risk model determines an associated risk minimization for each of the plurality of IIoT devices within the network based on the plurality of associated clusters of IIoT devices within the network and the shared risk value for each of the plurality of IIoT devices within the network.

In one or more embodiments, one or more computer-readable non-transitory storage media may embody software that is operable, when executed by a processor, to access a plurality of IIoT devices within a network. The software may be operable, when executed, to determine a shared risk model associated with the plurality of IIoT devices within the network. The software may be operable, when executed, to use the shared risk model to determine a shared risk value for each of the plurality of IIoT devices within the network. The software may be operable, when executed, to use the shared risk model to determine a plurality of associated clusters of the plurality of IoT devices within the network based on the shared risk value for each of the plurality of IoT devices within the network. The software may be operable, when executed, to use the shared risk model to determine an associated risk minimization for each of the plurality of IIoT devices within the network based on the plurality of associated clusters of IIoT devices within the network and the shared risk value for each of the plurality of IIoT devices within the network.

Technical advantages of certain embodiments of this disclosure may include one or more of the following. Certain apparatuses and methods described herein may determine a shared risk model for assessing shared risks for a plurality of devices within an IIoT network. The apparatus and the method may use the shared risk model to determine a plurality of associated clusters of IoT devices within the network based on the shared risk value for each of the plurality of IIoT devices within the network. In particular, the shared risk value includes a shared risk parameter, such as a unique shared risk type, and a shared risk parameter key value pair combination for any candidate risk factor associated with each of the plurality of IIoT devices. The shared risk model may be a controller based shared risk tree-twig-leaf model with a starting point as a root of the tree model for risk modeling. The apparatus and the method may use the shared risk model to determine an associated risk minimization for each of the plurality of IIoT devices within the network based on the plurality of associated clusters of IoT devices within the network and the shared risk value for each of the plurality of IIoT devices within the network. Certain embodiments may provide a corrective action for the plurality of IIoT devices based on the respective shared risk value to reduce shared risk for a critical target asset. Certain embodiments may provide a brown field device placement decision for a target new device within the network by evaluating potential hazards associated with the target new device in order to minimize shared risk.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

It is desired to develop an efficient security control method to prevent cybersecurity threats to the plurality of IIoT devices within a network. The security control method is critical to ensure good resiliency in failure scenarios in the plurality of IIoT devices. In particular, the IIoT network may apply the security control method to detect, identify, trace, and analyze each critical component or service that is incorporated into various systems of the IIoT network. The IIoT network may absorb stress, recover critical functionality, and make important decisions in agile environments to protect a critical target asset within the network. Therefore, the security control method may help a company to reinforce position and create functional advantage by proactively overcoming downturns and disruptions for business planning.

In an embodiment, this disclosure describes systems and methods to generate a security model based on shared risk groups (SRGs) for a plurality of devices within an IIoT network. A device may be a switch, a router, or a sensor within the IIoT network. In particular, each shared risk group is constituted based on a set of devices that share a specific resource whose failure may affect all devices in the set of devices. In a shared risk group, two or more IIoT devices share a common power infrastructure, so the two or more IIoT devices would suffer from a common failure at the same time if the common power infrastructure failed. There are three main shared risk candidates: 1) shared risk node group (SRNG) of common power source, 2) shared risk link group (SRLG) of common fiber/cable, and 3) shared risk equipment group (SREG) of common hardware line cards hosting multiple uplinks. For example, a common power source, such as a router or a switch, represents a junction of fiber spans for a shared risk node group. When the common power source fails, the failure affects all signals through the common power source. As another example, fiber spans are fiber optic cables that connect multiple nodes within the network. These fiber optic cables are bundled in the same conduit as a common fiber/cable for a shared risk link group. As another example, a node contains multiple hardware line cards hosting multiple uplinks for a shared risk equipment group. When the multiple hardware line cards hosting the multiple uplinks fail, the failure affects all channels through the multiple hardware line cards hosting the multiple uplinks.

In an embodiment, a shared risk model may characterize shared risk for a plurality of IIoT devices, such as routers, switches, and sensors. The shared risk model may be applied to evaluate impact assessment of an IIoT device failure on a set of connected end physical sensors group. The shared risk model may be determined based on a shared risk of common power source, a shared risk of using common fiber/cable, a shared risk of common hardware line cards hosting multiple uplinks, and a shared risk of common device location. For example, the shared risk model may be used to perform targeted optimization or user alerts on either a network layer, which includes a plurality of routers and switches, or a sensor device layer, which includes a plurality of sensors. For example, the shared risk model may be determined using heuristics-based values associated with the plurality of IIoT devices. As another example, the shared risk model may be determined using machine learning (ML) for a shared risk tree-twig-leaf model for the plurality of IIoT devices. The shared risk model has one or more tree root layers, one or more tree twig layers, and one or more tree leaf layers. In particular, the shared risk model typically starts with a single node as a tree root, which branches into possible communications, such as tree twigs. Each of those communications leads to additional nodes, such as tree leaves, which branch off into other possible communications. The accuracy of a shared risk model is controlled by a depth and a node splitting function of the shared risk model at the cost of increasing computation time. The shared risk model may be determined using a linearized relationship between different nodes in the shared risk model. Thus, a leaf in the shared risk model is associated with a single corresponding tree twig in the shared risk model based on prior experience or a self-learned likelihood value. The shared risk model may be efficiently applied in many applications for early detection of downtimes and/or failures of each of the plurality of devices within the IIoT network. Likewise, For example, the one or more tree root layers include one or more power supply feeder banks, fibers/interconnections, and hosting facility associated with the shared risk of common power source and the shared risk of using common fiber/cable. As another example, the one or more tree twig layers include one or more routers and switches associated with a shared risk of common IIoT router backbone layer, a shared risk of common IIoT switch access layer, and a shared risk of common IIoT hardware modules/uplink interfaces risk. As another example, the one or more tree leaf layers include one or more sensors associated with the shared risk of common power source, the shared risk of using common fiber/cable, the shared risk of common hardware line cards hosting multiple uplinks, and the shared risk of common device location. As a result, the shared risk model is useful to mitigate cybersecurity risk by automatically determining an optimized location, placement, connectivity, and interaction with upper layers for a new or existing device, such as sensor, switch, or router.

FIG. 1 illustrates an example security control system 100 for use in a product. In an embodiment, the security control system 100 may include IIoT device server 110, network 120, shared risk manager 130, and database 170. The shared risk manager 130 may be communicatively coupled to network 120 to receive data from the IIoT device server 110. The IIoT device server 110 is configured to include a switches/routers layer 102 and a sensors layer 104. For example, the switches/routers layer 102 includes a plurality of switches and routers. Each physical location in the switches/routers layer 102 is associated with one or more co-located switch/router devices that do not have a clear view on clustering based on shared risk. As another example, the sensors layer 104 includes a plurality of sensors. Each physical location in the sensors layer 104 is associated with various types of sensors installed ranging from tens to hundreds of sensors for various IIoT applications that do not have a clear view on clustering based on shared risk.

In an embodiment, the IIoT device server 110 may use a power supply feeder bank as a tree root to provide power service, such as power, signal, air, etc., to its follower branches which may include a set of switch/devices within the switches/routers layer 102 and a set of sensors in the sensors layer 104. For example, an operation may be performed to turn on a switch or a router for connecting the power service to its follower branches. As another example, an operation may be performed to turn off a switch or a router for disconnecting the power service to its follower branches.

In an embodiment, the IIoT device server 110 may be communicatively coupled to network 120 to exchange information associated with the plurality of IIoT devices, such as switches/routers and sensors. Network 120 broadly represents any wireline or wireless network, using any of satellite or terrestrial network links, such as public or private cloud on the Internet, local area networks (LANs), metropolitan area networks (MANs), wide area networks (WANs), a public switched telephone network (PSTN), campus network, internetworks, or combinations thereof. The network 120 may include or comprise the public internet and networked server computers that implement Web2 and/or Web3 technologies. The network 120 may comprise or support intranets, extranets, or virtual private networks (VPNs). The network 120 may also comprise a public switched telephone network (PSTN) using digital switches and call forwarding gear. The network 120 may also comprise a public switched telephone network (PSTN) using digital switches and call forwarding gear.

In an embodiment, the shared risk manager 130 may be configured to determine a shared risk value for each of the plurality of devices, such switches, routers, or sensors, of the IIoT device server 110 using one or more shared risk models 142. The shared risk manager 130 may receive information from the IIoT device server 110 via network 120 to determine the one or more shared risk models 142. In particular, the shared risk value for each of the plurality of devices may include: 1) SRNG: shared risk of common power source, 2) SRLG: shared risk of common fiber/cables, and 3) SREG: shared risk of common hardware line cards hosting multiple uplinks. These variations of shared risk help ensure better resiliency in failure scenarios of industrial switches/routers.

In an embodiment, the shared risk manager 130 may be configured to include a modeling module 132, a clustering module 134, an optimization module 136, and a models server 140. The modeling module 132 may determine one or more shared risk models 142 using the information received from the IIoT device server 110. For example, the modeling module 132 may be applied to generate one or more shared risk models 142 using manually assigned values for the shared risk associated with three different IIoT routers on site/location L1, which share common power feed from the same power supply within the IIoT network. Each shared risk entity, such as a switch, a router, or a sensor, within the IIoT network may be represented by a shared risk value, which is a shared risk parameter name and shared risk parameter key value pair, such as a shared risk value of "Shared Power Supply Risk Value: 1." The shared risk parameter key value for each shared risk entity of the shared risk model is an associated positive integer based numerical value assigned by a user or a controller. As another example, the modeling module 132 may be applied to generate one or more shared risk model 142 using a shared risk tree-twig-leaf model. The shared risk tree-twig-leaf model is a mathematical model that uses a shared risk value to define shared risk at every layer of the model. In the shared risk tree-twigleaf model, a given shared risk value is represented as a shared risk parameter and shared risk parameter key value pair, such as a given shared risk type and a shared risk key value. The given shared risk type may be created at a controller layer, such as the shared risk manager 130, of the security control system 100. The controller layer may assign an initial value and manage the shared risk type lifetime behavior. The shared risk type may be modified by a user based on prior experience. Likewise, the shared risk tree-twig-leaf model may be naturally extended by incorporating a new tree twig entity at the tree twig layer as per the design or user needs, such as pluggable, equipment vendor type, etc. Thus, the one and more shared risk models 142 may accurately represent shared risk hierarchy for the plurality of IIoT devices in the IIoT device server 110. The one and more shared risk models 142 enable the controller layer to determine a shared risk value for each single entity in the hierarchical shared risk tree-twig-leaf model.

In an embodiment, the clustering module 134 may be configured to use the shared risk values and the shared risk tree-twig-leaf model to determine a target clustering model, such as clustering models 144, for a plurality of end IIoT devices, such as a cluster of sensors, which share a common infrastructure and have a set of shared risks that are outcomes of the shared risk tree-twig-leaf model. For example, the clustering module 134 may determine one or more clustering models 144 based on different shared risk candidates, such as SRNG, SRLG, and SREG. For example, the clustering module 134 may be configured to determine a clustering model of shared risk node groups associated with the plurality of IIoT devices using an unsupervised machine learning algorithm, such as k-means. The clustering model may be applied to perform the classification to determine multiple logical clusters 152 among the plurality of IIoT devices based on one or more attributes, such as shared risk type, shared risk key value, physical location, etc. The k-means algorithm may start with k random cluster center points and then solve the optimization problem by minimizing an objective function by assigning data points to the nearest cluster center. Once this assignment is done, the k-means algorithm recomputes the cluster center. This process continues until there is not much change in the cluster assignment. As a result, the clustering model may be applied to determine shared power supply risk for end devices clustering.

In an embodiment, the optimization module 136 may be configured to determine associated optimization outcomes, such as logical clusters 152, corrective actions 154, and brown field device placement actions 156. The logical clusters 152 may be determined based on the shared risk values and individual risk values in the shared risk tree-twig-leaf model for the plurality of IIoT devices. In particular, the plurality of IIoT devices may be clustered on the basis of either a shared risk type or an end-to-end hierarchical risk tree root-twig-leaf model. For example, the optimization module 136 may determine a first plurality of logical clusters 152 for shared power supply risk. As another example, the optimization module 136 may determine a second plurality of logical clusters 152 for shared fiber/cable risk. As another example, the optimization module 136 may determine a third plurality of logical clusters 152 for shared hardware/line card risk.

In an embodiment, the optimization module 136 may determine the corrective actions 154 using the shared risk values based on individual risk values or the shared risk tree-twig-leaf model for the plurality of IIoT devices. Based on the shared risk tree-twig-leaf model, the optimization module 136 may determine a plurality of corrective actions 154 for a set of critical target assets. For example, the corrective actions 154 may be determined to reduce the shared risk for the set of critical target assets. As another example, the corrective actions 154 may be determined to create a safeguard by minimizing shared risk for one or more critical target assets. In particular, distributed power sources may be used to minimize shared power risk within the IIoT network. Therefore, the optimization module 136 may use fine control over the plurality of IIoT devices and any needed modification for the IIoT network to minimize the shared risk for the set of critical target assets. The optimization module 136 may use the shared risk model to perform assessment, computation, prediction of shared risk visibility from any node of the shared risk tree-twig-leaf model along all directions towards different end tree leaves. The optimization module 136 may determine a fast isolation of a failed node based on an impacted and failed tree segment identification. The identified tree segment includes one or more tree twigs and tree leaves which also fail due to the failed node. This fast isolation may be achieved both proactively without any active failure in the network and reactively when the network encounters a specific kind of failure. As a result, the optimization module 136 may evaluate balancing/re-distribution of resources such as shared power, shared IIoT routers, etc. based on the associated optimization outcomes.

Furthermore, the optimization module 136 may take proactive actions by determining a plan of tree twig maintenance events in the corrective actions 154. The plan of tree twig maintenance events may enable the shared risk manager 130 to identify one or more nodes, such as switches, routers, and sensors, within the IIoT network whose malfunction and/or failure may impact the one or more critical target assets in the IIoT network. The optimization module 136 may maintain and automatically re-evaluate the shared risk tree-twig-leaf model to add or remove a link, a switch, a router, or a sensor within the IIoT network.

In an embodiment, the optimization module 136 may determine brown field device placement actions 156 for a new device to be added to the IIoT network. A brown field device may be a sensor, a switch, or a router as a target new device of the IIoT device server 110. For example, the optimization module 136 may comprise a graphical user interface (e.g., a display), a touchscreen, a touchpad, keys, buttons, a mouse, or any other suitable type of hardware that allows a user to view the shared risk models 142 on a graphic user interface (GUI) and/or to provide inputs into the security control system 100. In particular, the optimization module 136 may interact with a user to use the shared risk manager 130 in advance for a given planned placement for an IIoT device or sensor. As a result, the optimization module 136 may efficiently determine a proper decision with respect to criticality and placement group of the target new device. As another example, the optimization module 136 may use an optimization algorithm, such as k-nearest neighbor (kNN), to determine k positions of nodes in the shared risk models 142 to minimize the shared risk. In particular, the positions may be determined based on a plurality of attributes, such as location, placement, connectivity, interaction with upper layers. The optimization module 136 may calculate Euclidian distance based on the plurality of attributes for different positions of the target new device for the shared risk models 142, which incorporate the target new device and a previously stored distance based on the plurality of attributes for the shared risk models 142, which do not incorporate the target new device. The position with the smallest Euclidian distance is the one with the optimal position of the target new device in the shared risk model 142. As a result, the optimization module 136 may provide end-to-end visualization for the shared risk model 142 in an automated process of shared risk assessment for the plurality of IIoT devices in the IIoT device server 110. The security control system 100 may efficiently optimize the shared risk models 142 to evaluate potential hazards associated with the target new device in order to mitigate or minimize the shared risks.

Each of the functional components of the security control system 100 may be implemented as software components, general or specific-purpose hardware components, firmware components, or any combination thereof. A storage component, such as database 170, may be implemented using any of relational databases, object databases, or flat file systems. The storage component may be a repository to store logical clusters 152, corrective actions 154, and brown field device placement actions 156. The storage component may be connected to the functional components locally or through the networks using programmatic calls, remote procedure call (RPC) facilities or a messaging bus. A component may or may not be self-contained. Depending upon implementation-specific or other considerations, the components may be centralized or distributed functionally or physically.

Although FIG. 1 describes and illustrates particular components, devices, or systems carrying out particular actions, this disclosure contemplates any suitable combination of any suitable components, devices, or systems carrying out any suitable actions.

Figure 2:
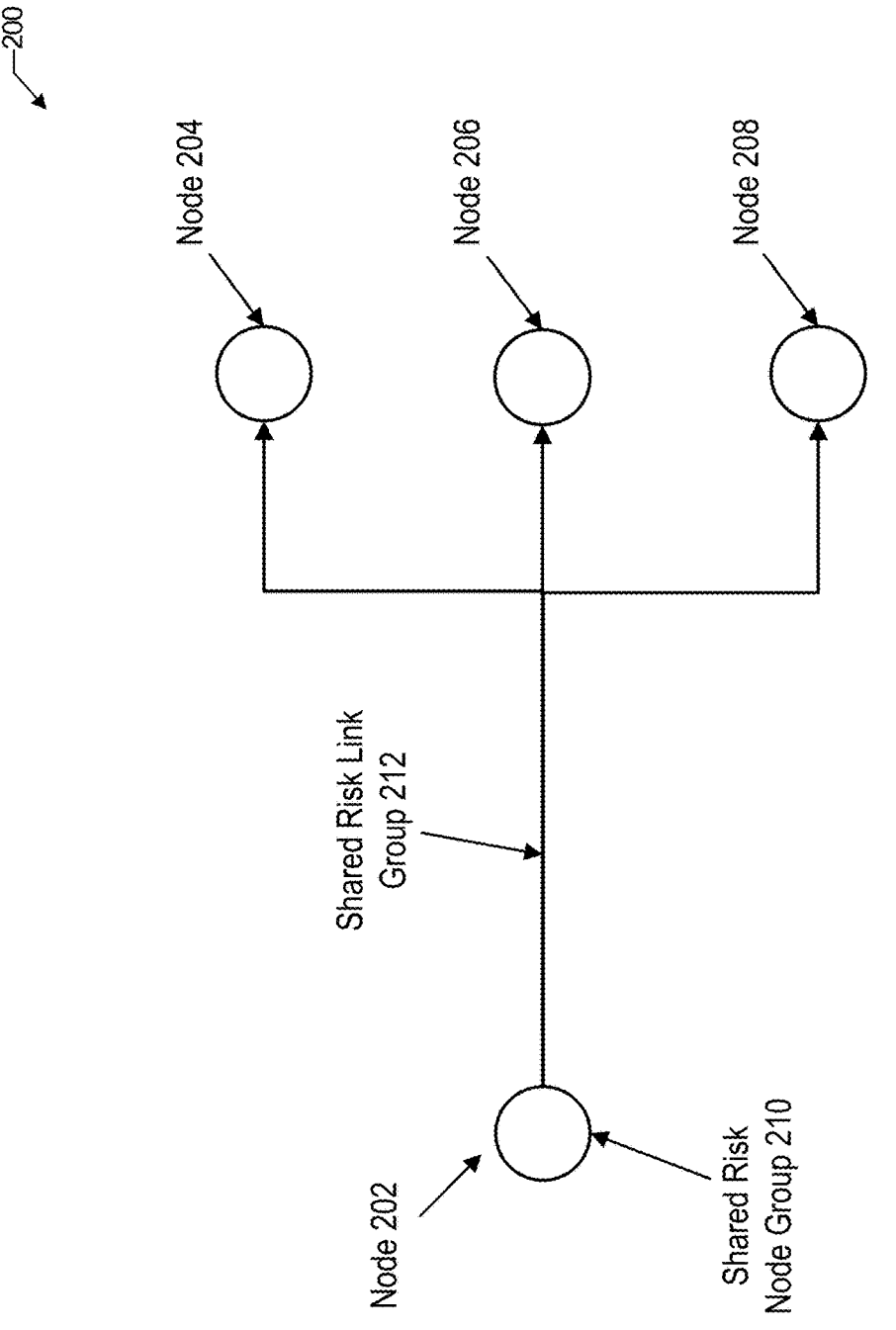
FIG. 2 illustrates an example shared risk group 200.

FIG. 2 illustrates an example shared risk group 200. The shared risk group 200 represents a multiprotocol label switching (MPLS) routing technique in telecommunication networks. A failure of a common shared risk group may cause a common failure for different networks in the group. For example, an upper layer node 202 is a common source power with a fiber span, which includes fiber optic cables that connect a plurality of lower layer nodes, such as node 204, node 206, and node 208. In particular, node 202 may be a device in a first routed domain, which is attached to common edge devices in a secondary route territory, such as node 204, node 206, and node 208. Node 202 may be a member of a shared risk node group 210 because a failure of node 202 may affect all signals through node 202. As a result, the plurality of lower layer nodes, such as node 204, node 206, and node 208, may suffer from a common failure as in a common shared risk node group 210.

As another example, the fiber optic cables may be bundled together on a common concrete conduit as a shared risk link group 212. If the common concrete conduit goes down, which causes a cut on the fiber span, the cut of fiber span would make all circuits go down in shared risk link group 212.

As another example, a node, such as node 202, may contain hardware line cards hosting multiple uplinks. A common hardware line card may be a shared risk equipment group because a failure of the common hardware line card may affect all channels through associated with the common hardware line card.

In an embodiment, the security control system 100 may include one or more shared risk groups 200, which may be any suitable configuration or combination of components that have a shared risk. In an embodiment, the one or more shared risk groups 200 may include the shared risk node group, the shared risk link group, and the shared risk equipment group, or combinations thereof. In an embodiment, the one or more shared risk groups 200 may differ from examples in FIG. 2. The security control system 100 may be programmed to evaluate the one or more shared risk groups 200 to control and monitor various components, such as routers, switches, and sensors, of the IIoT network.

Figure 3:
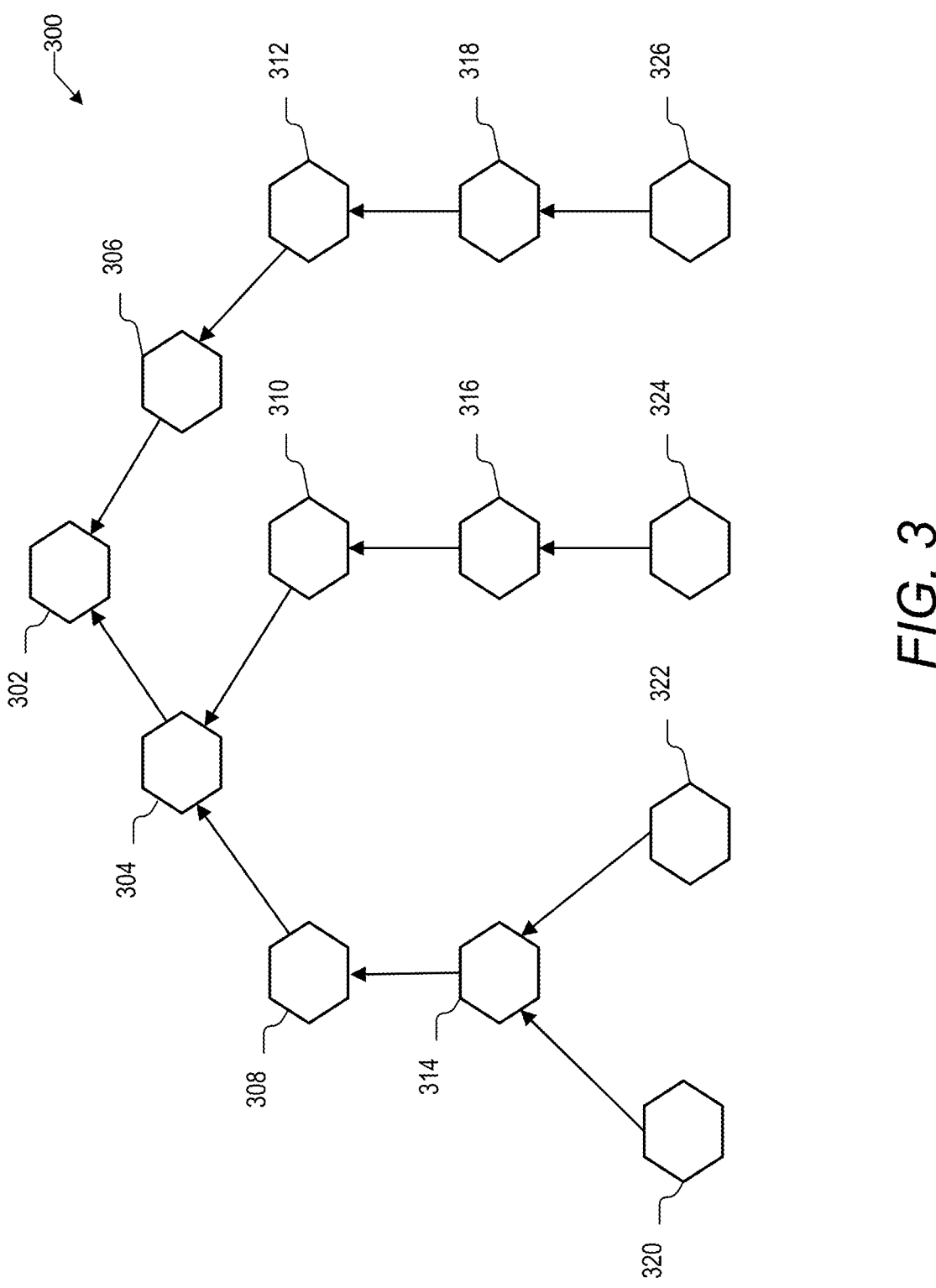
FIG. 3 illustrates an example shared risk tree-twig-leaf model 300.

FIG. 3 illustrates an example shared risk tree-twig-leaf model 300. The shared risk tree-twig-leaf model 300 may be a mathematical model that defines shared risk at every layer of the shared risk model. For example, the shared risk tree-twig-leaf model 300 may include a plurality of nodes in five layers: 1) Physical Infra (root) layer: node 302; 2) IIoT router layer (TWIG1) layer: node 304 and node 306; 3) IIoT switch layer (TWIG2) layer: node 308, node 310, and node 312; 4) uplink interfaces and IIoT hardware module level (TWIG 3) layer: node 314, node 316, and node 318; and 5) IIoT sensors (LEAF4) layer: node 320, node 322, node 324, and node 326. In the shared risk tree-twig-leaf model 300, each of the plurality of nodes may be represented by a shared risk parameter and a shared risk parameter key value pair, created at a controller layer of the security control system 100, such as shared risk manager 130. The controller layer may assign an initial value and manage the shared risk type during the lifetime of the IIoT network. Furthermore, a user may use the controller layer and other system control components to maintain and update the shared risk type. In particular, the shared risk parameter is associated with a key that defines different shared risk types, such as "Physical Infra," "Shared Router," "Shared Switch," "IntrLM," and "Sensr." The shared risk parameter key value is associated with a shared risk value, such as a positive integer value, which is controller assigned or user assigned N bit field. An example of a shared risk tree-twig-leaf model may be found in Table 1 below.

TABLE 1

An example of a shared risk tree-twig-leaf model.

| Layer | Description | Shared Risk Type | Risk Definition | Risk Definition Assignment |
|---|---|---|---|---|
| 1 | Root | Physical Infra | Shared Power Risk and Shared Cabling/Fibering Risk | User Assigned |
| 2 | TWIG1 | IIoT Backbone Router | Shared Router | User Assigned |
| 3 | TWIG2 | IIoT Access Switch | Shared Switch | Controller Assigned |
| 4 | TWIG3 | Uplink Interface and IIoT Hardware Module | IntraLM Interface + Line Module | Controller Assigned |
| 5 | LEAF4 | IIoT End Devices and Sensors | Sensor | Controller/User Assigned |

In an embodiment, the shared risk tree-twig-leaf model 300 may be a hierarchical PG-1T model in the form of a tree. For example, the first layer of "Root" has one node, such as node 302. Node 302 is a root of the tree model, which may be a power feeder, or a fibers/interconnections and hosting facility. Node 302 may be represented by a shared risk parameter of "Physical Infra: 0001" and a shared risk parameter key value of "1001" pair in a 4-bit field. In particular, the shared risk parameter of "Physical Infra" may be further classified as two different definitions of shared risks: "shared power risk" and "shared cabling/fibering risk." As another example, there are three layers of tree twigs in the shared risk tree-twig-leaf model 300: the second layer of "TWIG1," the third layer of "TWIG2," and the third layer of "TWIG3." In particular, the second layer of "TWIG1" has two nodes, such as node 304 and node 306, connected to the root node of the first layer. The third layer of "TWIG2" has three nodes, such as node 308, node 310, and node 312, connected to the second layer. The fourth layer of "TWIG3" has three nodes, such as node 314, node 316, and node 318, connected to the third layer. Each of the twig layers may include a target IIoT connectivity/backbone/access layer, such as shared router backbone layer risk for the second layer, shared switch layer risk for the third layer, and shared hardware modules or uplink interfaces risk for the fourth layer. As another example, the fifth layer of "LEAF4" has four nodes, such as node 320, node 322, node 324, and node 326, associated with different IIoT end devices. The shared risk at the fifth layer of "LEAF4" is associated with different IIoT end devices connected to the last mile entities. An example of shared risk parameters and shared risk parameter key values for different nodes in the shared risk tree-twig-leaf model is illustrated in Table 2 below.

TABLE 2

An example of shared risk parameters and shared risk parameter key values.

| Node | Layer: Shared Risk Parameter (4-bit field) | Shared Risk Parameter Key Value (4-bit field) |
|---|---|---|
| 302 | Root: Physical Infra (0001) | 9 (1001) |
| 304 | TWIG1: Shared Router (0010) | 10 (1010) |
| 306 | TWIG1: Shared Router (0010) | 11 (1011) |
| 308 | TWIG2: Shared Switch (0011) | 4 (0100) |
| 310 | TWIG2: Shared Switch (0011) | 5 (0101) |
| 312 | TWIG2: Shared Switch (0011) | 6 (0110) |
| 314 | TWIG3: IntrLM (0100) | 8 (1000) |
| 316 | TWIG3: IntrLM (0100) | 5 (0101) |
| 318 | TWIG3: IntrLM (0100) | 3 (0011) |
| 320 | LEAF4: Sensr (0101) | 4 (0100) |

TABLE 2-continued

An example of shared risk parameters and shared risk parameter key values.

| Node | Layer: Shared Risk Parameter (4-bit field) | Shared Risk Parameter Key Value (4-bit field) |
|---|---|---|
| 322 | LEAF4: Sensr (0101) | 6 (0110) |
| 324 | LEAF4: Sensr (0101) | 5 (0101) |
| 326 | LEAF4: Sensr (0101) | 1 (0001) |

In an embodiment, the shared risk tree-twig-leaf model 300 may provide an end-to-end automated shared risk assessment for any given leaf in the tree based on shared risk groups. In particular, the security control system 100 may use the shared risk model to determine an aggregate shared risk link group value for a leaf node of a shared risk link group in the shared risk model based on a combination of a shared risk value of a root node, one or more shared risk values of one or more twig nodes, and a shared risk value of the leaf node. The shared risk link group includes the root node, the one or more twig nodes, and the leaf node. For example, the shared risk for node 320 may be affected by the shared risks of node 302, node 304, node 308, and node 314. As another example, the shared risk for node 326 may be affected by the shared risks of node 302, node 306, node 312, and node 318. The shared risk tree-twig-leaf model 300 may provide a complete visualization of the shared risk against each sensor in the HOT network. As a result, the shared risk tree-twig-leaf model may be used to efficiently identify a plurality of common power sources and associated shared risks as an aggregated connection associated with each end IIoT device or senser among a plurality of devices in the IIoT device server 110. An example of shared risk groups for different leaf nodes is illustrated in Table 3 below.

TABLE 3

An example of shared risk groups for different leaf nodes.

| Layer | Node 320 | Node 322 | Node 324 | Node 326 |
|---|---|---|---|---|
| Root: Physical Infra:Value | 0001:1001 | 0001:1001 | 0001:1001 | 0001:1001 |
| TWIG1: Shared Router:Value | 0010:1010 | 0010:1010 | 0010:1010 | 0010:1011 |
| TWIG2: Shared Switch:Value | 0011:0100 | 0011:0100 | 0011:0101 | 0011:0110 |
| TWIG3: IntrLM:Value | 0100:1000 | 0100:1000 | 0100:0101 | 0100:0011 |
| LEAF4: Sensr:Value | 0101:0100 | 0101:0110 | 0101:0101 | 0101:0001 |

In an embodiment, the shared risk tree-twig-leaf model may include one or more shared risk groups and leaf nodes which may be any suitable configuration or combination of shared risk groups and leaf nodes that have a shared risk. In an embodiment, the one or more shared risk groups may include the shared risk node group, the shared risk link group, and the shared risk equipment group, or combinations thereof. In an embodiment, the one or more shared risk groups may differ from examples in FIG. 2. The security control system 100 may be programmed to evaluate the one or more shared risk groups for different leaf nodes to determine the shared risk tree-twig-leaf model for the plurality of IIoT devices.

Figure 4:
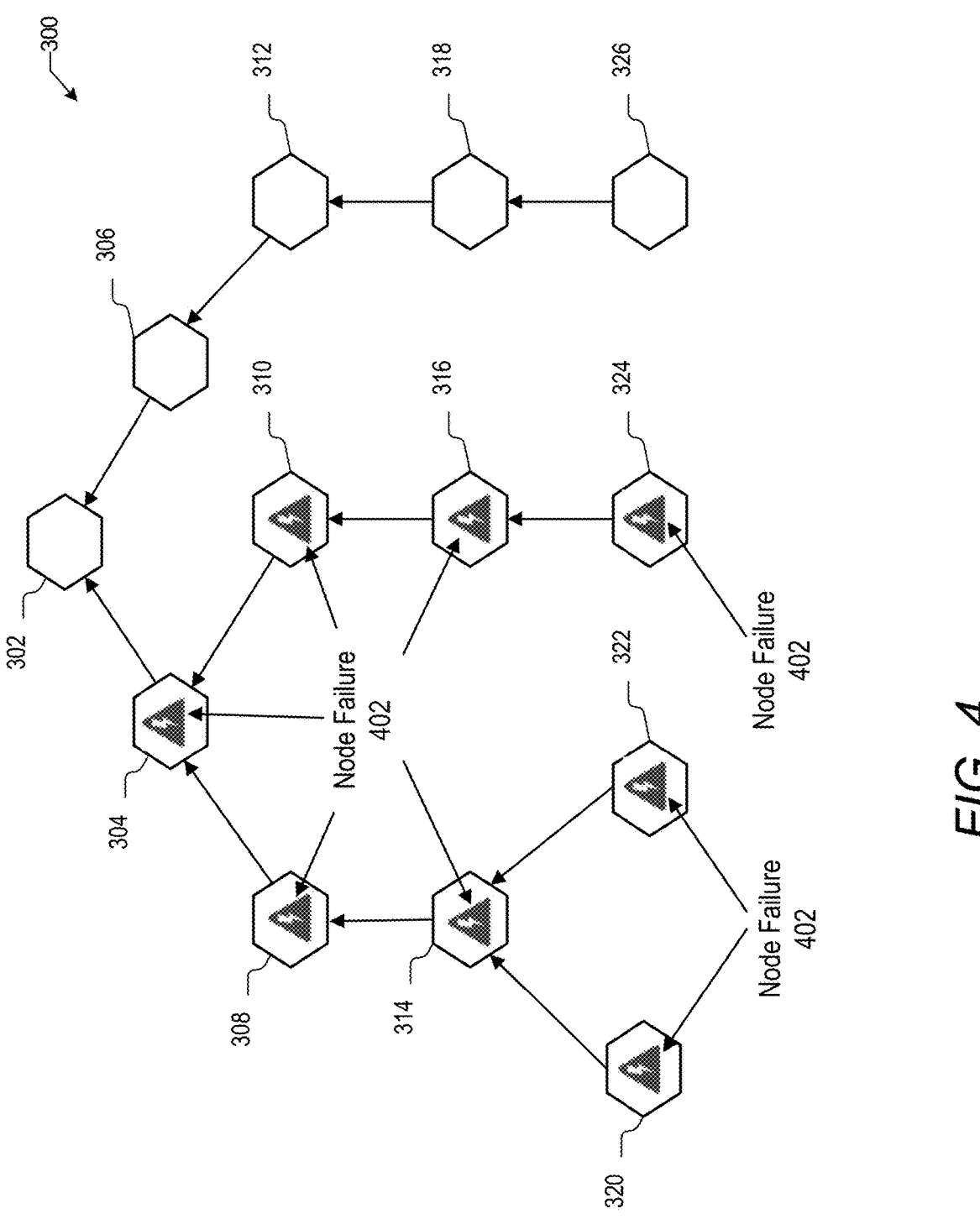
FIG. 4 illustrates an example shared risk tree-twig-leaf model 300 with failed nodes.

FIG. 4 illustrates an example shared risk tree-twig-leaf model 300 with failed nodes. The optimization module 136 may be configured to display the shared risk tree-twig-leaf model 300 via the GUI to monitor the plurality of devices of the IIoT device server 110. In particular, a failure of a device, such as node 304 which is a router, may cause a catastrophic node failure 402 for other nodes, such as node 308, node 310, node 314, node 316, node 320, node 322, and node 324, which share a common the power source associated with node 304. Furthermore, the shared risk tree-twig-leaf model may also enable the shared risk manager 130 to proactively plan tree twig maintenance events. For example, in the event of node 304 failure/proactive maintenance, the shared risk manager 130 may help a user efficiently identify which nodes suffer a common failure associated with node 304 and take proactive actions to effectively minimize shared risk for the IIoT network within a short period of time.

In an embodiment, the failure may occur at any suitable node of the shared risk tree-twig-leaf model. In an embodiment, the security control system 100 may be programmed to take proactive actions for any suitable nodes which suffer a common failure to effectively minimize shared risk for the IIoT network.

Figure 5:
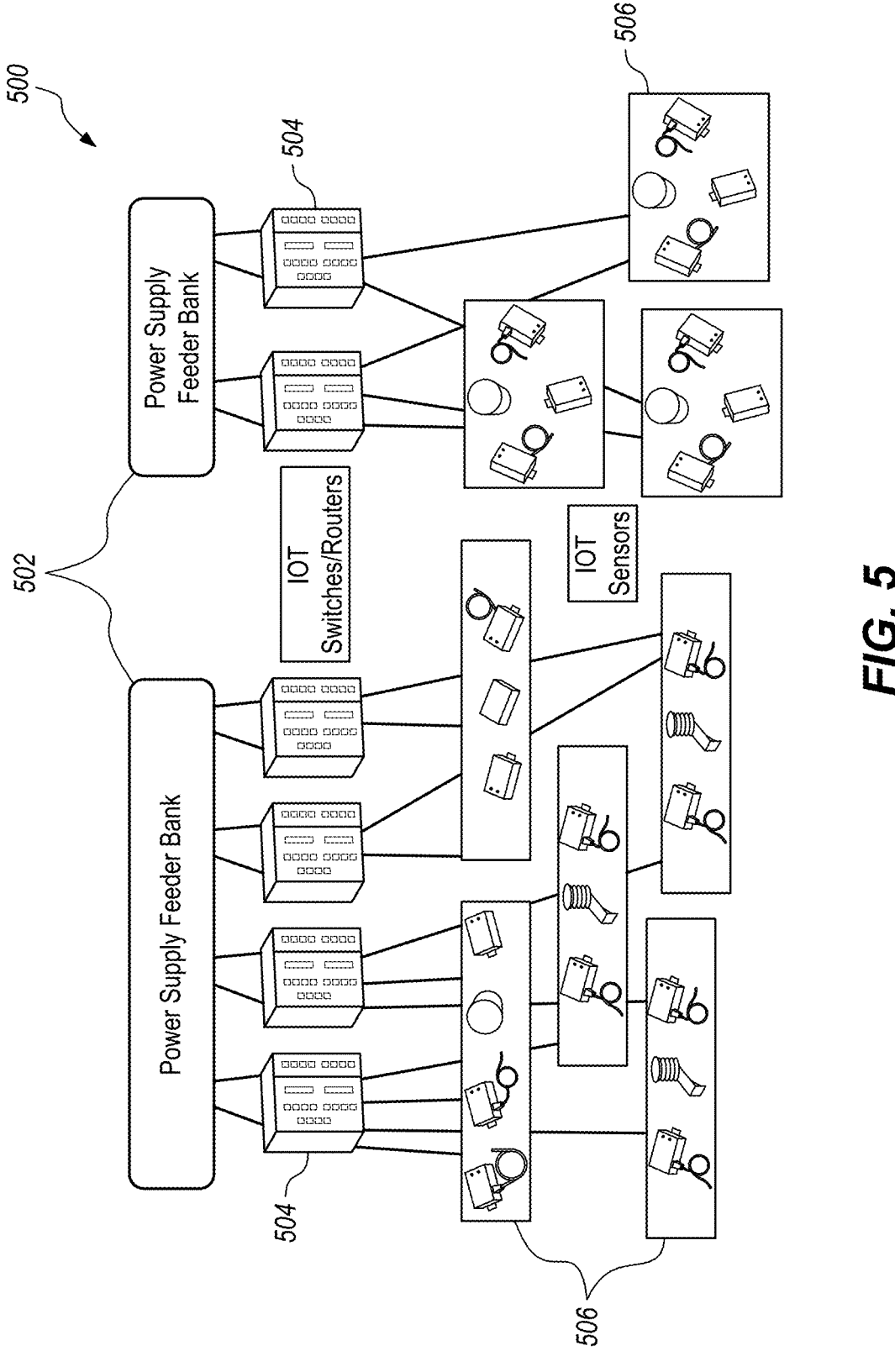
FIG. 5 illustrates an example IIoT network 500. The IIoT network 500 includes two power supply feeder banks 502.

FIG. 5 illustrates an example IIoT network 500. The IIoT network 500 includes two power supply feeder banks 502. Each of the two power supply feeder banks 502 is connected to one or more IIoT switches/routers 504. Each of the one or more IIoT switches/routers 504 is connected to one or more IIoT sensors 506. Because a switch or router may be associated with tens to hundreds of sensors for various IIoT applications, there is not a clear view on clustering for the IIoT switches/routers 504 and the IIoT sensors 506 based on shared risks.

In an embodiment, it is difficult to determine a protection scheme or protective actions for the one or more IIoT switches/routers 504 and IIoT sensors 506 due to topological complications for so many IIoT devices in the IIoT network 500. In particular, because the IIoT devices are not clustered based on shared risk groups, it is very difficult to identify one or more IIoT devices that suffer the same failure or different failures. For example, it is not clear which IIoT switches/routers 504 are responsible for a failure of an IIoT sensor 506. Therefore, it is time consuming to compute a primary path, such as a shortest path, for node failure/proactive maintenance for each IIoT device.

Figure 6:
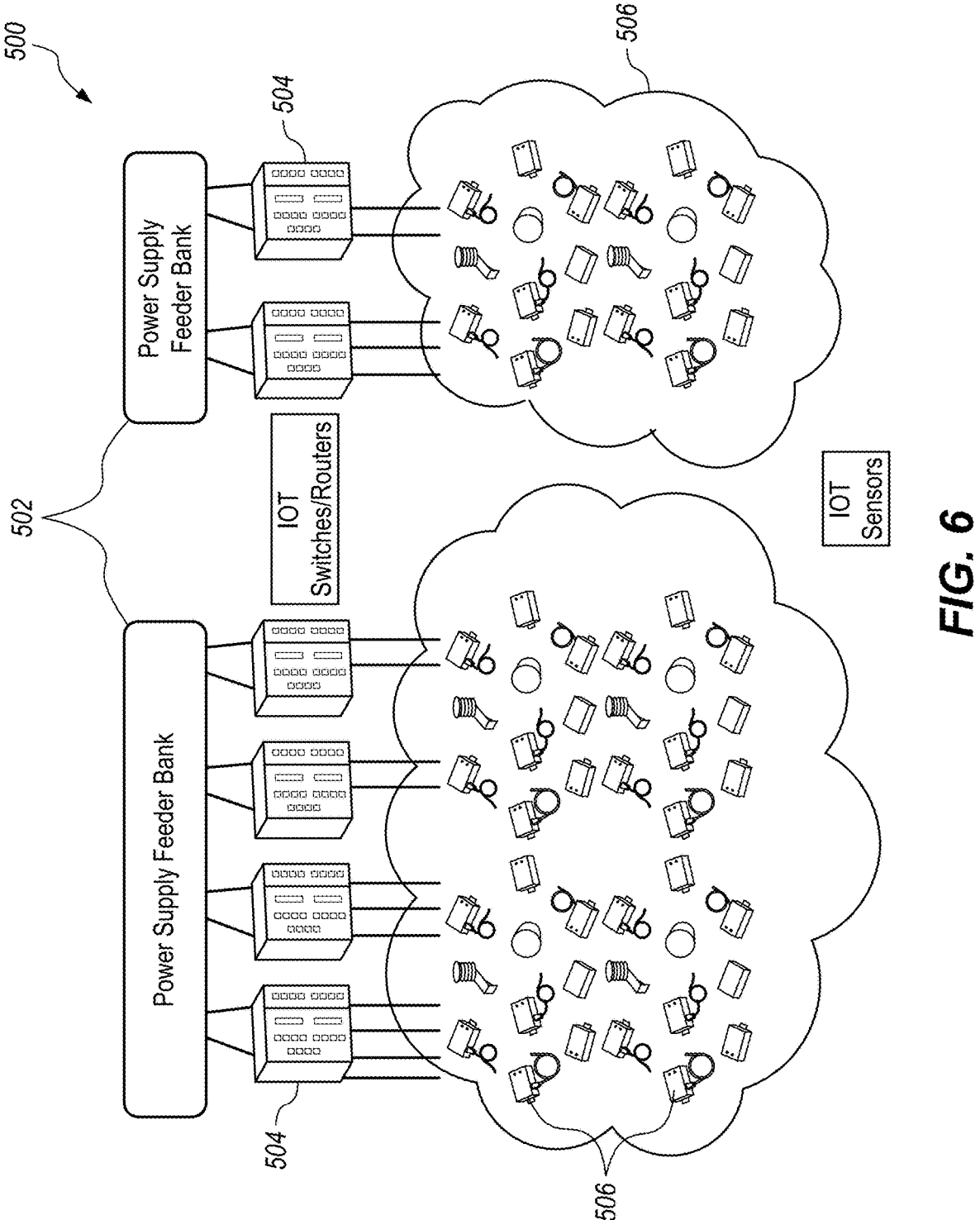
FIG. 6 illustrates the IIoT network 500 based on a shared risk of a common power supply source.

FIG. 6 illustrates the IIoT network 500 based on a shared risk of a common power supply source. In particular, the shared risk manager 130 may automatically identify one or more shared risk groups based on a shared risk of a common power supply source, such as power supply feeder banks 502. In this example, a first power supply feeder bank is associated with four IIoT switches/routers 504, and a second power supply feeder bank is associated with two IIoT switches/routers 504. Therefore, a failed first power supply feeder bank may result in failures at the four associated IIoT switches/routers 504. Furthermore, the IIoT network 500 may also be described based on shared risk of common fiber/cables, shared risks of hardware line cards hosting multiple uplinks, and/or shared risk of common device location.

In an embodiment, the security control system 100 may use a shared risk tree-twig-leaf model to determine a protection scheme or protective actions for the one or more IIoT switches/routers 504 and IIoT sensors 506. In particular, because the IIoT devices are clustered based on shared risk groups, the security control system 100 may efficiently identify one or more IIoT devices that suffer the same failure or different failures. For example, it is clear which IIoT switches/routers 504 are responsible for a failure of an IIoT sensor 506. Therefore, the security control system may find a robust solution for node failure/proactive maintenance for each IIoT device.

Figure 7:
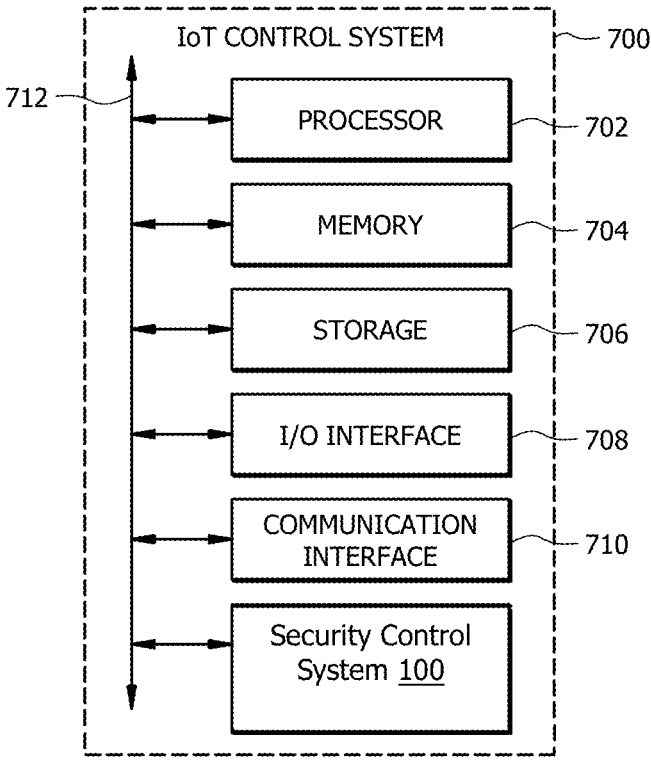
FIG. 7 illustrates an example IIoT control system 700.

FIG. 7 illustrates an example IIoT control system 700. In particular embodiments, one or more IIoT control systems 700 perform one or more steps of one or more methods described or illustrated herein. In particular embodiments, one or more IIoT control systems 700 provide functionality described or illustrated herein. In particular embodiments, software running on one or more IIoT control systems 700 performs one or more steps of one or more methods described or illustrated herein or provides functionality described or illustrated herein. Particular embodiments include one or more portions of one or more IIoT control systems 700. Herein, reference to an information handling system may encompass a computer or a computing device, and vice versa, where appropriate. Moreover, reference to an information handling system may encompass one or more computer systems, where appropriate. Further, the security control system 100 in FIG. 1 may be incorporated into the illustrated IIoT control system 700. With reference to the present disclosure, the IIoT control system 700 may be the aforementioned product incorporating the security control system 100, as described above with respect to FIG. 1. As such, "product" and "IoT control system 700" may herein be used interchangeably.

This disclosure contemplates any suitable number of IIoT control systems 700. This disclosure contemplates IIoT control system 700 taking any suitable physical form. As example and not by way of limitation, IIoT control system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a main-frame, a mesh of computer systems, a mobile telephone, a personal digital assistant (PDA), a server, a tablet computer system, an augmented/virtual reality device, or a combination of two or more of these. Where appropriate, IIoT control system 700 may include one or more IIoT control systems 700; be unitary or distributed; span multiple locations; span multiple machines; span multiple data centers; or reside in a cloud, which may include one or more cloud components in one or more networks. Where appropriate, one or more IIoT control systems 700 may perform without substantial spatial or temporal limitation one or more steps of one or more methods described or illustrated herein. As an example and not by way of limitation, one or more IIoT control systems 700 may perform in real time or in batch mode one or more steps of one or more methods described or illustrated herein. One or more IIoT control systems 700 may perform at different times or at different locations one or more steps of one or more methods described or illustrated herein, where appropriate.

In particular embodiments, IIoT control system 700 includes a processor 702, memory 704, storage 706, an input/output (I/O) interface 708, a communication interface 710, and a bus 712. Although this disclosure describes and illustrates a particular information handling system having a particular number of particular components in a particular arrangement, this disclosure contemplates any suitable information handling system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, IIoT control system 700 may load instructions from storage 706 or another source (such as, for example, another IIoT control system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory manage-ment units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be inter-nal or external to IIoT control system 700, where appropri-ate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating com-munication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between IIoT control system 700 and one or more I/O devices. IIoT control system 700 may include one or more of these I/O devices, where appropriate. One or more of these I/O devices may enable communication between a person and IIoT control system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between IIoT control system 700 and one or more other IIoT control systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, IIoT control system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, IIoT control system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. IIoT control system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of IIoT control system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In an embodiment, IIoT control system 700 may be configured to assess a plurality of switches/routers and sensors in an IIoT network (see FIG. 8). In an embodiment, IIoT control system 700 may be configured to use a modeling module 132 to create one or more shared risk models 142 for the plurality of switches/routers and sensors in the IIoT network. In an embodiment, IIoT control system 700 may be configured to use a clustering module 134 to determine one or more clustering models 144 based on the one or more shared risk models 142 and the plurality of switches/routers and sensors in the IIoT network. In an embodiment, IIoT control system 700 may be configured to use an optimization module 136 to determine a plurality of logical clusters 152, a plurality of corrective actions 154, and a plurality of brown field device placement actions 156.

FIG. 8 illustrates an example method to use the security control system 100 (referring to FIG. 1) of IIoT control system 700 (referring to FIG. 7) for determining a shared risk model for a plurality of IIoT devices. The method 800 may begin at step 805, where the security control system 100 may access a plurality of IIoT devices within a network. The plurality of IIoT devices may include switches, routers, and sensors in industries, such as manufacturing, transportation, oil and gas, power generation and transmission, mines, and ports, etc. In particular, the plurality of IIoT devices may be connected via optic fibers within the network in a building. For example, two or more switching/routing devices share a common power source as in a shared risk node group. As another example, two optic fibers are bundled in the same conduit as in a shared risk link group.

At step 810, the security control system 100 may determine a shared risk model associated with the plurality of IIoT devices within the network. The security control system 100 may receive information from the plurality of IIoT devices to determine the shared risk model associated with the plurality of IIoT devices within the network. In particular, the security control system 100 may determine a controller based risk tree-twig-leaf model using the plurality of IIoT devices based on three different candidates: 1) SRNG: shared risk of common power source, 2) SRLG: shared risk of common fiber/cables, and 3) SREG: shared risk of common hardware line cards hosting multiple uplinks.

At step 815, the security control system 100 may use the shared risk model to determine a target shared risk value for each of the plurality of IIoT devices within the network. Each of the plurality of IIoT devices in the shared risk model may be represented by a node and a target shared risk value, such as a shared risk parameter and a shared risk parameter key value pair. For example, the target shared risk value may be associated with an individual risk or a shared risk based on SRNG, SRLG, and/or SREG. As another example, the target shared risk value may be assigned by a user or a controller of the security control system 100, such as shared risk manager 130.

At step 820, the security control system 100 may use the shared risk model to determine a plurality of associated clusters of IIoT devices within the network based on the target shared risk value for each of the plurality of IIoT devices within the network. In particular, the security control system 100 may use a clustering algorithm, such as k-means, to perform classification to determine multiple natural clusters among the plurality of IIoT devices based on one or more attributes, such as shared risk type, shared risk value, physical location, etc.

At step 825, the security control system 100 may use the shared risk model to determine an associated risk minimization for each of the plurality of IIoT devices within the network based on the plurality of associated clusters of IIoT devices within the network and the target shared risk value for each of the plurality of IIoT devices within the network. In particular, the security control system 100 may determine a corrective action of the associated risk minimization for a target device, such as a critical target asset to ensure risk minimization. Furthermore, the security control system 100 may determine brown field device placement decision for a target new device for end IIoT device planning. As a result, the security control system 100 may use the shared risk model to determine proper decision regarding criticality, placement group of the target new device.

Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method to determine a shared risk model for a plurality of IIoT devices, including the particular steps of the method of FIG. 8, this disclosure contemplates any suitable method including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. An apparatus for managing a plurality of Industrial Internet of Things (IIoT) devices in a network, comprising:
   one or more processors; and
   one or more computer-readable non-transitory storage media comprising instructions that, when executed by the one or more processors, cause one or more components of the apparatus to perform operations comprising:
      accessing the plurality of IIoT devices within the network;
      receiving information from the plurality of IIoT devices;
      determining a shared risk model associated with the plurality of IIoT devices within the network based on the received information;
      determining, using the shared risk model, a shared risk value for each of the plurality of IIoT devices within the network;
      determining, using the shared risk model, a plurality of associated clusters of the plurality of IIoT devices within the network based on the shared risk value for each of the plurality of IIoT devices within the network; and
      determining, using the shared risk model, an associated risk minimization for each of the plurality of IIoT devices within the network based on the plurality of associated clusters of IIoT devices within the network and the shared risk value for each of the plurality of IIoT devices within the network, and
      wherein:
      the associated risk minimization includes a corrective action for the plurality of IIoT devices based on the shared risk value to reduce shared risk for a critical target asset, and
      the associated risk minimization includes a brown field device placement decision for a target new device within the network by evaluating potential hazards associated with the target new device in order to minimize shared risk.

2. The apparatus of claim 1, wherein the plurality of IIoT devices include two or more of cameras, badge readers, AC control systems, sensors, computers, switches, and routers.

3. The apparatus of claim 1, wherein the one or more components of the apparatus perform operations further comprising:

determining the shared risk model based on a shared risk of common power source, a shared risk of using common fiber/cable, a shared risk of common hardware line cards hosting multiple uplinks, and a shared risk of common device location; and determining, using the shared risk model, an aggregate shared risk link group value for a leaf node of a shared risk link group in the shared risk model based on a combination of a shared risk value of a root node, one or more shared risk values of one or more twig nodes, and a shared risk value of the leaf node, wherein the shared risk link group includes the root node, the one or more twig nodes, and the leaf node.

4. The apparatus of claim 1, wherein:

the shared risk model is shared risk tree-twig-leaf model which defines shared risk at each layer of a hierarchical model.

5. The apparatus of claim 1, wherein:

the shared risk model has one or more tree root layers, one or more tree twig layers, and one or more tree leaf layers.

6. The apparatus of claim 5, wherein:

the one or more tree root layers include one or more power supply feeder banks, fibers/interconnections, and hosting facility associated with shared risk of a common power source and shared risk of using common fiber/cable, the one or more tree twig layers include one or more routers and switches associated with a shared risk of common IIoT router backbone layer, a shared risk of common IIoT switch access layer, and a shared risk of common IIoT hardware modules/uplink interfaces risk, and the one or more tree leaf layers include one or more sensors associated with the shared risk of common power source, the shared risk of using common fiber/cable, a shared risk of common hardware line cards hosting multiple uplinks, and a shared risk of common device location.

7. The apparatus of claim 1, wherein each shared risk entity of the shared risk model is represented by a shared risk parameter name and a shared risk parameter key value pair.

8. The apparatus of claim 7, wherein the shared risk parameter key value pair for each shared risk entity of the shared risk model is an associated positive integer based numerical value assigned by a user or a controller.

9. The apparatus of claim 7, wherein the shared risk parameter name is one selected from a group consisting of the shared risk parameter name is one selected from a group consisting of "Physical Infra," "Shared Router," "Shared Switch," "IntrLM," and "Sensr".

10. A computer-implemented method executed by a security control system for managing a plurality of Industrial Internet of Things (IIoT) devices in a network, the method comprising:

accessing the plurality of IIoT devices within the network;

receiving information from the plurality of IIoT devices;

determining a shared risk model associated with the plurality of IIoT devices within the network based on the received information;

determining, using the shared risk model, a shared risk value for each of the plurality of IIoT devices within the network;

determining, using the shared risk model, a plurality of associated clusters of the plurality of IIoT devices within the network based on the shared risk value for each of the plurality of IIoT devices within the network; and determining, using the shared risk model, an associated risk minimization for each of the plurality of IIoT devices within the network based on the plurality of associated clusters of IIoT devices within the network and the shared risk value for each of the plurality of IIoT devices within the network, and wherein:

the associated risk minimization includes a corrective action for the plurality of IIoT devices based on the shared risk value to reduce shared risk for a critical target asset, and the associated risk minimization includes a brown field device placement decision for a target new device within the network by evaluating potential hazards associated with the target new device in order to minimize shared risk.

11. The computer-implemented method of claim 10, wherein the plurality of IIoT devices include two or more of cameras, badge readers, AC control systems, sensors, computers, switches, and routers.

12. The computer-implemented method of claim 10, further comprising:

determining the shared risk model based on a shared risk of common power source, a shared risk of using common fiber/cable, a shared risk of common hardware line cards hosting multiple uplinks, and a shared risk of common device location; and determining, using the shared risk model, an aggregate shared risk link group value for a leaf node of a shared risk link group in the shared risk model based on a combination of a shared risk value of a root node, one or more shared risk values of one or more twig nodes, and a shared risk value of the leaf node, wherein the shared risk link group includes the root node, the one or more twig nodes, and the leaf node.

13. The computer-implemented method of claim 10, wherein:

the shared risk model is shared risk tree-twig-leaf model which defines shared risk at each layer of a hierarchical model.

14. The computer-implemented method of claim 10, wherein:

the shared risk model has one or more tree root layers, one or more tree twig layers, and one or more tree leaf layers.

15. The computer-implemented method of claim 14, wherein:

the one or more tree root layers include one or more power supply feeder banks, fibers/interconnections, and hosting facility associated with shared risk of common power source and shared risk of using common fiber/cable, the one or more tree twig layers include one or more routers and switches associated with a shared risk of common IIoT router backbone layer, a shared risk of common IIoT switch access layer, and a shared risk of common IIoT hardware modules/uplink interfaces risk, and the one or more tree leaf layers include one or more sensors associated with the shared risk of common power source, the shared risk of using common fiber/ cable, a shared risk of common hardware line cards hosting multiple uplinks, and a shared risk of common device location.

16. The computer-implemented method of claim 10, wherein each shared risk entity of the shared risk model is represented by a shared risk parameter name and a shared risk parameter key value pair.

17. The computer-implemented method of claim 16, wherein:

the shared risk parameter key value pair for each shared risk entity of the shared risk model is an associated positive integer based numerical value assigned by a user or a controller, and the shared risk parameter name is one selected from a group consisting of "Physical Infra," "Shared Router," "Shared Switch," "IntrLM," and "Sensr".

18. A non-transitory computer-readable medium comprising instructions that are configured, when executed by a processor, to execute a method for managing a plurality of Industrial Internet of Things (IIoT) devices in a network, the method comprising:

accessing the plurality of IIoT devices within the network;

receiving information from the plurality of IIoT devices;

determining a shared risk model associated with the plurality of IIoT devices within the network based on the received information;

determining, using the shared risk model, a shared risk value for each of the plurality of IIoT devices within the network;

determining, using the shared risk model, a plurality of associated clusters of the plurality of IIoT devices within the network based on the shared risk value for each of the plurality of IIoT devices within the network; and determining, using the shared risk model, an associated risk minimization for each of the plurality of IIoT devices within the network based on the plurality of associated clusters of IIoT devices within the network and the shared risk value for each of the plurality of IIoT devices within the network, and wherein:

the associated risk minimization includes a corrective action for the plurality of IIoT devices based on the shared risk value to reduce shared risk for a critical target asset, and the associated risk minimization includes a brown field device placement decision for a target new device within the network by evaluating potential hazards associated with the target new device in order to minimize shared risk.

\* \* \* \* \*